United States Patent
Klein et al.

[11] 3,729,069
[45] Apr. 24, 1973

[54] DISC BRAKE ROTOR WIPER AND NOISE SUPPRESSOR

[75] Inventors: Bruce W. Klein; John L. Turak, both of South Bend, Ind.

[73] Assignee: The Bendix Corporation, South Bend, Ind.

[22] Filed: June 28, 1971

[21] Appl. No.: 157,212

[52] U.S. Cl. ................. 188/72.5, 188/1 B, 188/71.1
[51] Int. Cl. .............................................. F16d 55/228
[58] Field of Search ........................ 188/73.1, 250 B, 188/71.1, 72.4, 72.5, 72.1, 73.3, 59, 1 B

[56] References Cited

UNITED STATES PATENTS 3,121,477  2/1964  Maloney et al. ................. 188/72.5
3,506,098  4/1970  Anders ............................. 188/73.5

FOREIGN PATENTS OR APPLICATIONS 321,634     6/1957  Switzerland ..................... 188/72.4
1,190,602   5/1970  Great Britain .................. 185/72.4

Primary Examiner—George E. A. Halvosa
Attorney—William N. Antonis et al.

[57] ABSTRACT

A disc brake having a rotor with opposed braking surfaces thereon engageable respectively by two friction pads, the radial widths of which are greater than the radial widths of the respective braking surfaces which the pads overlie so that the pads will overlap the braking surfaces at their inner and outer radii.

1 Claim, 4 Drawing Figures

Patented April 24, 1973

INVENTORS
BRUCE W. KLEIN &
JOHN L. TURAK
BY
Plante, Hartz, Smith & Thompson
ATTORNEYS Patented April 24, 1973

INVENTORS
BRUCE W. KLEIN &
BY  JOHN L. TURAK

ATTORNEYS

DISC BRAKE ROTOR WIPER AND NOISE SUPPRESSOR

BACKGROUND OF THE INVENTION

Disc brakes for automotive vehicles have grown in popularity in the past decade due principally to their stopping effectiveness under the most rigorous environmental conditions. This capability of the disc brake can be further improved by employing the invention herein disclosed.

In spite of the advantages of the disc brake of the prior art, it has certain drawbacks which prevent its unqualified acceptance on an industry wide basis. Disc brakes generally employ splash shields on their inboard side to protect the rotors from road contaminants, such as dirt, salt, chemicals, etc. The splash shield only renders the problem less acute but does not eliminate the condition. The outboard side of the rotor is usually adequately protected from these contaminants by the wheel per se. Although it is conceded that the splash shield performs a very useful function in minimizing the accumulation of road contaminants on the rotor, thus improving braking effectiveness and prolonging lining life, it is also recognized that the splash shield not only adds to the cost of the brake but it has the disadvantage of functioning as a barrier to the free dissipation of brake heat to the surrounding atmosphere. And, of course, as the brake temperature increases, the braking torque drops off, thus rendering the brakes less effective. In an attempt to combat this perplexing situation, various forms of rotor wiping and scraping devices have been proposed by the prior art. U.S. Pat. No. 2,496,699, for example, proposes coping with the problem of contaminants by wiping the braking surface of the rotor subjected to the pad engagement with a circular non-metallic absorbent. There is some question as to the adequacy of this absorbent in maintaining the rotor free of chemicals and salt in particular, which have a corrosive effect. Also, U.S. Pat. No. 3,473,631 suggests scraping and polishing of the rotor braking surface. This latter approach utilizes metal to metal engagement, which is generally unsatisfactory due to the noise level developed with such an arrangement as well as the high wear rate of the rotor when in rubbing relationship with metal.

Although the prior teachings have proposed many solutions to the problem, none has actually come to grips with the basic difficulty, namely corrosion of the braking surfaces of the rotor caused by the initial formation of a band of oxide or rust at the inner and outer edges of the rotor. An attack on the basic cause of rotor corrosion is described in the commonly assigned U.S. Pat. application Ser. No. 11,987, filed Feb. 16, 1970 now U.S. Pat. No. 3,629,814. This invention is an improvement thereover and also overcomes many of the other shortcomings of the prior art.

SUMMARY OF THE INVENTION

Therefore, an important object of the invention is to provide a lining pad for a brake rotor, the radial width of which is greater than the radial width of the braking surface of the rotor in order that the pad will overlie the inner and outer radii of the braking surface.

A further object of the invention is to provide a disc brake having a rotor with a braking surface on which a friction pad rides in overlapping relationship to said braking surface so that the overlap extends beyond and in engagement with the outer periphery of the rotor and the inner radii of the braking surface.

Another object of the invention is to provide a disc brake having a rotor with opposed annular braking surfaces engageable respectively with lining pads overlapping the inner and outer radii of the annular braking surfaces.

A still further object of the invention is to provide a disc brake assembly in which brake noise is suppressed by utilizing friction pads with a given configuration.

The above and other objects and features of the invention will become apparent from the following description taken in connection with the accompanying drawings.

DETAIL DESCRIPTION

Figure 1:
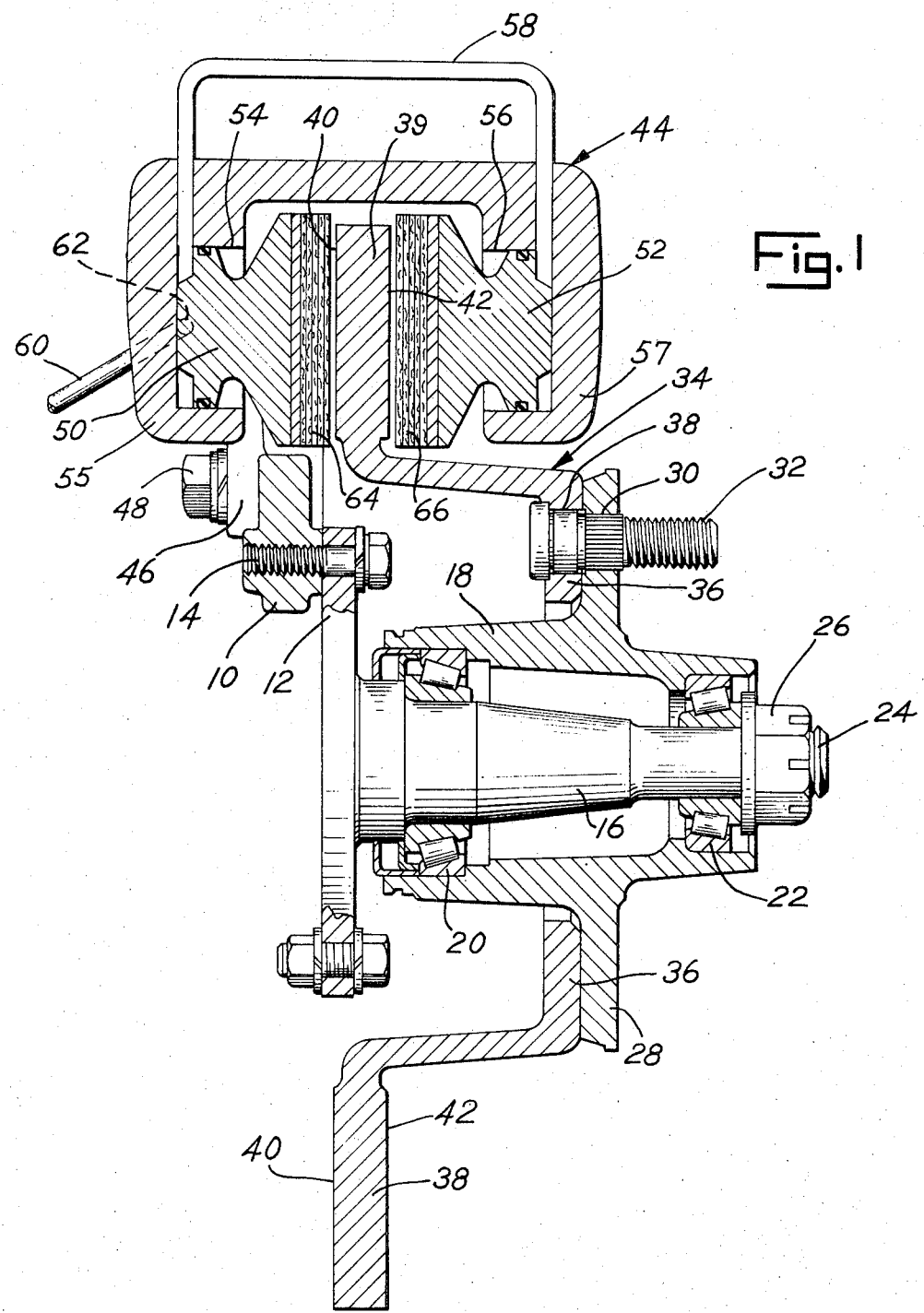
FIG. 1 is a partial vertical sectional view taken along the axis of a front wheel hub of a vehicle incorporating a disc brake utilizing the invention.

Referring now to the drawings and particularly FIG. 1, a fixed support member or mounting bracket 10 is secured to a flange 12 of the front wheel steering knuckle of an automotive vehicle by bolts 14. Integral with the steering knuckle flange 12 and extending axially therefrom is a front wheel spindle 16, which rotatably receives front wheel hub 18. Bearings 20 and 22 rotatably locate the hub 18 on the spindle 16. The outer end of the spindle 16 is threaded at 24 to accommodate a nut 26 which adjustably carries the hub and spindle in assembled relationship. The hub 18 is formed with a flange 28, having a series of circumferentially spaced holes 30 therein, only one of which is shown. Bolts 32, only one of which is shown, pass through these holes 30 to secure the wheel, not shown, to the outboard side of the axle flange 28.

The disc brake herein disclosed includes a rotatable member or rotor 34 equipped with an inner flange 36 which is provided with holes 38, only one of which is shown, in registry with the holes 30 of the flange 28 in order to receive the bolts 32, which also secures the wheel, not shown, in position in the hub 18. The rotor 34 is further formed at its outer portion 39 with opposed annular braking surfaces 40 and 42. These braking surfaces are preferably machined to a desired smoothness. A brake housing or caliper 44, which includes an integrally formed flange 46, is attached to the bracket 10 by studs 48, only one of which is shown. The caliper 44 houses a pair of oppositely acting pistons 50 and 52 slidingly carried in bores 54 and 56, respectively. The bores are formed in radially inwardly extending legs 55 and 57 of the caliper 44. A tube 58 connects the closed ends of the bores to establish equal pressures on the inner ends of the pistons 50 and 52. A hydraulic brake system supply line 60 is connected to inlet port 62 located in the closed end of the bore 54. Friction pads 64 and 66 are mounted respectively to the pistons 50 and 52 for frictional contact with the annular braking surfaces 40 and 42 upon pressurization of the hydraulic fluid in the supply line 60 in communication with the closed ends of the bores 54 and 56. The means employed in actuating the friction pads 64 and 66 into engagement with the rotor braking surfaces are not material to the invention and may be done by any of the well known expedients, such as the structure shown and described herein.

Figure 2:
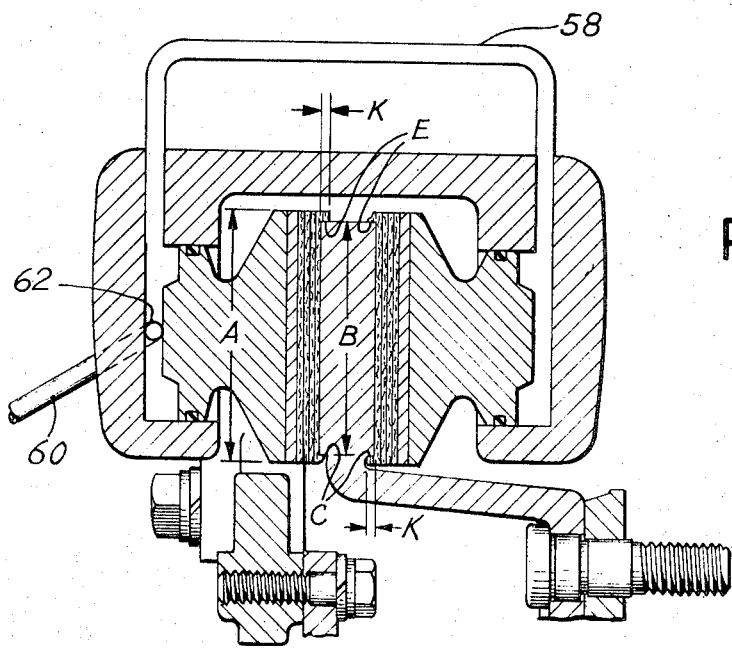
FIG. 2 is a fragmentary view of the disc brake of FIG. 1, illustrating the location of the friction pads in their brake applied position.

FIG. 2 illustrates the worn friction pads in their brake applied relationship to the annular braking surfaces. It will be observed that the friction pads 64 and 66, when considered in relationship to the rotor axis, are of a radial width A, which is greater than the radial width B of the annular braking surfaces 40 and 42 of the rotor. The radial widths of the friction pads 64 and 66 are such that the pads overlap the inner radii C and the outer radii E of the annular braking surfaces 40 and 42. This overhang or overlap 65 and 67 of the friction pads 64 and 66 respectively should be such as to create a good rubbing surface against the inner and outer radii C and B to prevent the accumulation of corrosive oxides. Actually the precise amount of radial overlap is determined to a great extent by the dimensional limitations of the caliper housing. As the pads 64 and 66 wear, the lateral or axial depths K of the overlapping portions of the pads tend to increase at the inner and outer radii C and E. As the axial depth K of the overlap grows, it may be broken off by vibration or by engagement between the pads and rotor. However, the continual wearing away of the pad causes the overlap portion to again grow to the depth K. As seen in FIG. 2, the depth K of the overlap by pads 64 and 65 on the periphery or outer radii E of the rotor is greater than on the inner radii C. This is due to the wiping contact of the pads 64 and 66 at their inner radii C with the rotor 34. The arrangement of the pads in the manner disclosed also has the advantage of damping vibrations and preventing pad movement which suppresses brake noise or squeal.

Figure 3:
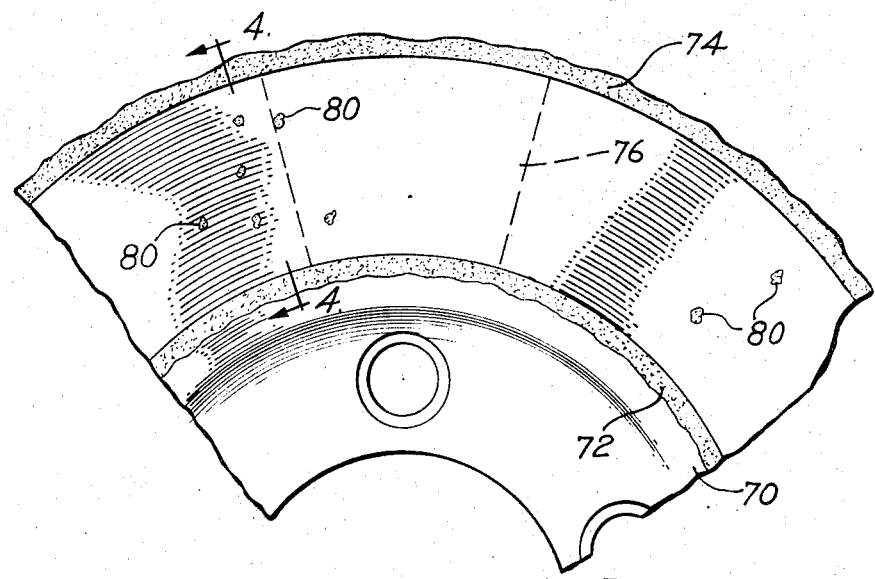
FIG. 3 is a fragmentary side elevational view of a rotor showing the corrosive effect of chemicals, etc. on the braking surface of a rotor not employing the invention.
Figure 4:
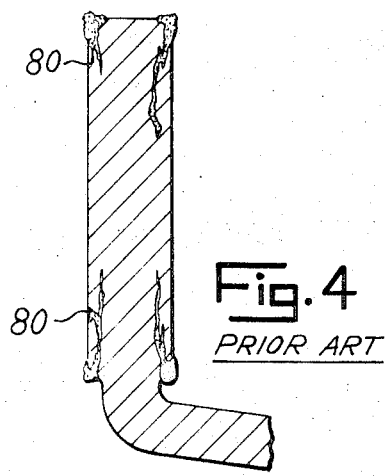
FIG. 4 is a section taken on the line 4—4 of FIG. 3.

FIGS. 3 and 4 show a rotor 70 on which rust and corrosion have accumulated at the inner and outer radii 72 and 74. This is representative of what occurs in actual practice on the disc brakes presently used. It is to be noted that the braking surface 78, swept by the pad 76 shown superimposed on the rotor braking surface for illustration, is scored and pitted at 80 by the rust and corrosion which has penetrated to the braking surface from the inner and outer radii 72 and 74, as shown in FIGS. 3 and 4. Experimentation and tests show that these bands of rust and corrosion 72 and 74 form the nucleus from which further rotor deterioration is inevitable. Moreover, tests reveal conclusively that locating the friction pad so that it overlaps the inner and outer radii of the rotor braking surface, as aforementioned, effectively maintains the rotor free of contaminants, including the corrosive type.

MODE OF OPERATION

Initially, that is, when the friction pads 64 and 66 are new and unworn, only the annular braking surfaces of the rotor between inner and outer radii C and E will be effectively swept clean of all contaminants, thus preventing the accumulation of rust and corrosion on the entire annular area of the braking surfaces. However, as the friction pads wear, as best shown in FIG. 2, the overlaps 65 and 67 of the friction pads 64 and 66 respectively increase to an axial depth K which rubbingly and wipingly engage the inner and outer radii C and E. This growth K on the overlapping portions 65 and 67 is gradual, but as K increases in depth any rust or corrosion which has previously attached to the inner and outer radii C and E will be wiped away. This wiping action is positive and is effective in maintaining the rotor braking surfaces free of contaminants.

While there have been described above the principles of this invention in connection with a specific device, it is to be understood that this description is made only by way of example and not as a limitation to the scope of the invention.

We claim:

1. In a disc brake for a vehicle wherein a rotor is exposed to road contaminants, said rotor including a braking surface portion having a free peripheral surface and a peripheral surface formed at a junction between said braking surface portion and a web portion, means for removing said contaminants from the peripheral surfaces of the rotor, said means comprising:

a caliper housing surrounding said rotor with a first leg and a second leg radially projecting inwardly, said first leg having a first bore therein and said second leg having a second bore therein;

a first piston slidably retained in said first bore;

a second piston slidably retained in said second bore;

a first friction pad fixed on first piston, said first friction pad having an actual radial width greater than, and a wear surface radial width equal to, the radial width between the peripheral surfaces of said rotor;

a second friction pad fixed on said second piston, said second friction pad having a radial width and a wear surface equal to said first friction pad, the thickness of said friction pads being substantially greater than the difference between the thicknesses of said brake surface portion and said web-; and actuation means responsive to an operator for equally supplying said first and second bores with a hydraulic pressure sufficient to move said first and second pistons and the first and second friction pads respectively carried thereon into engagement with said rotor, said friction pads upon engagement with said rotor being adapted to overlap said peripheral surfaces of the rotor to wipe away any contaminants contained thereon which could cause deterioration to said rotor, said first and second friction pads upon overlapping said rotor suppressing any noise created upon engagement of the wear surface and said rotor to provide a relatively quiet braking engagement.

* * * * *